United States Patent
Gears

(10) Patent No.: US 8,040,091 B2
(45) Date of Patent: Oct. 18, 2011

(54) METHOD AND APPARATUS FOR STALL DETECTION

(75) Inventor: Richard Trevor Gears, New Milton (GB)

(73) Assignee: PG Drives Technology Ltd. (GB)

( * ) Notice: Subject to any disclaimer, the term of this patent is extended or adjusted under 35 U.S.C. 154(b) by 511 days.

(21) Appl. No.: 12/339,714

(22) Filed: Dec. 19, 2008

(65) Prior Publication Data

US 2009/0211822 A1    Aug. 27, 2009

(30) Foreign Application Priority Data

Dec. 22, 2007   (GB) .................................. 0725169.7

(51) Int. Cl.
*H02H 7/093*   (2006.01)
*B62D 11/02*   (2006.01)

(52) U.S. Cl. .................... 318/400.21; 318/430; 318/432; 180/6.5

(58) Field of Classification Search ............. 318/400.21, 318/430–434, 460, 466, 469; 180/6.5; 388/805, 388/814; 701/43

See application file for complete search history.

(56) References Cited

U.S. PATENT DOCUMENTS

| | | | |
|---|---|---|---|
| 4,467,250 A |   | 8/1984 | Thomasson |
| 5,335,307 A | * | 8/1994 | Sommer ........................ 388/814 |
| 5,483,135 A | * | 1/1996 | Parks ............................ 318/469 |
| 5,517,415 A | * | 5/1996 | Miller et al. ..................... 701/43 |
| 5,952,802 A | * | 9/1999 | Pimley .......................... 318/468 |
| 5,982,124 A | * | 11/1999 | Wang ............................ 318/466 |
| 2002/0185926 A1 |   | 12/2002 | King et al. |
| 2004/0124798 A1 | * | 7/2004 | Fukumura et al. ............ 318/468 |
| 2005/0258681 A1 | * | 11/2005 | Fulks et al. ........................ 303/3 |
| 2007/0114965 A1 |   | 5/2007 | Kutsuna et al. |

* cited by examiner

*Primary Examiner* — Paul Ip
(74) *Attorney, Agent, or Firm* — Waddey & Patterson, P.C.; Emily A. Shouse

(57) ABSTRACT

Stall detection apparatus for an electric motor controller has an input for receiving a drive error flag indicating if the controller is unable to achieve the required motor velocity and an input for receiving a signal in order to measure, directly or indirectly, the actual motor velocity. The actual motor velocity is determined in order to indicate whether the motor is stationary and, only if so, a stall signal is outputted in order to indicate that said motor has stalled.

11 Claims, 1 Drawing Sheet

METHOD AND APPARATUS FOR STALL DETECTION

CROSS-REFERENCES TO RELATED APPLICATIONS

This application claims benefit of the following patent application which is hereby incorporated by reference: UK Patent Application No. 0725169.7, filed Dec. 22, 2007.

BACKGROUND OF THE INVENTION

1. Field of the Invention

This invention relates generally to a method and apparatus for stall detection in respect of a motor and, more particularly but not necessarily exclusively, to a method and apparatus for stall detection in respect of a drive motor of a power-driven vehicle such as a motorized wheelchair.

Motorized wheelchairs generally include left and right drive wheels driven by a motor controller via corresponding left and right drive motors. In general, during operation, electric motors generate heat from the current flow through resistive windings. This heat energy, within the enclosed environment of a motor, can quickly raise both the internal general temperature and the spot temperature well above the rated temperature and, therefore, cause damage. This damage can be in the form of shorted or open windings, degradation of the motor assembly or even fire. Thus, the motor controller is required to include a mechanism for limiting the temperature rise to within predetermined operating limits.

In the case of a motor having multiple windings, when the motor is rotating at speed, the heat energy is applied to all windings, thereby spreading the total lost energy over a relatively large area. However, during stall conditions when the motor is stationary, all the heat energy is directed across one or two windings, which causes those individual windings to heat up far more rapidly than they would during normal operating conditions, which in turn makes them much more susceptible to failure. Thus, it is highly desirable for the temperature limiting mechanism of the motor controller to include means for detecting that the motor has stalled.

2. Description of the Prior Art

Prior art mechanisms for stall detection use direct measurement of the speed of rotation of the motor. In the event that maximum current and power are being drawn but the motor is determined to be stationary, a stall condition is indicated. Japanese patent application no. JP2004343998 describes a motor controller including a speed detection circuit for generating a signal indicating the rotational speed of the motor. Means are provided for isolating the motor from the power source in the event that a stall condition is determined based on the signal from the speed detection circuit.

It is an object of the present invention to provide a stall detection mechanism for a motor controller that does not require the use of additional, relatively expensive hardware sensors for directly measuring the rotational speed of the motor.

BRIEF SUMMARY OF THE INVENTION

In accordance with the present invention, there is provided stall detection apparatus for an electric motor controller, the apparatus comprising: an input for receiving a "Drive Error" flag indicating if the controller is unable to achieve the required motor velocity;

an input for receiving a signal measuring, directly or indirectly, the actual motor velocity; and means for determining if said actual motor velocity is indicative that said motor is both near stationary and unable to achieve the said required motor velocity, and if so, outputting a "Motor Stalled" flag indicating that said motor is stalled.

Also in accordance with the present invention, there is provided a method for stall detection in respect of an electric motor, the method comprising:

receiving a flag indicating if the controller is unable to achieve the required motor velocity;

receiving a signal measuring, directly or indirectly, the actual motor velocity; and determining if said actual motor velocity is indicative that said motor is both near stationary and unable to achieve the said required motor velocity, and if so, outputting a flag indicating that said motor is stalled.

The present invention also extends to an electric motor controller including stall detection apparatus according to the present invention, and to a motorized vehicle, such as a wheelchair, having at least one electric motor and a motor controller including stall detection apparatus according to the present invention.

It will be appreciated, therefore, that the stall detection apparatus of the present invention can be implemented entirely in software and does not require an additional hardware motor speed detection sensor.

The means for determining if said actual motor velocity is indicative that said motor is stationary preferably comprises means for evaluating a discriminator function whose inputs are the said actual motor velocity and one or more user programmable values which define said actual motor velocity measurement error estimates or tolerance margins, wherein if said actual motor velocity is within the threshold defined by said discriminator function, it is indicative that the motor is stationary. The discriminator function, may, for example, be a rectangular function and is used to ensure that the apparatus discriminates between errors in the said actual motor velocity measurement and prevents incorrect triggering of the stall detection output when the motor is being driven away from zero.

Preferably, the said "Drive Error" flag, indicative that the controller cannot achieve the demand velocity, is fed to a first input of a function having at least two inputs, wherein the second input receives the said "Stationary" flag indicative that the motor is stationary, the output of said function being the "Stall" flag if all inputs indicate the presence of a stall condition.

The apparatus beneficially further comprises a debounce filter so as to prevent transient conditions from triggering the stall detect output. The said "Stall" flag (which is only output if the all inputs to the function, indicating that the motor control algorithm detects an error and the motor is stationary, indicate the presence of a stall condition) is fed to an input of the debounce filter. The output of the debounce filter is indicative of whether or not the said motor has stalled. Preferably, the debounce filter comprises of a bidirectional counter that sets an output flag when a predetermined value has been reached. Thus, every 1 ms, say, the debounce counter increments if the "Stall" flag is being received and down if it is not. Only when the debounce counter reaches a predetermined value, will the "Motor Stalled" flag be output indicating that the motor has stalled.

These and other aspects of the present invention will be apparent from, and elucidated with reference to, the embodiment described herein.

An embodiment of the present invention will now be described by way of example only and with reference to the accompanying drawing.

DETAILED DESCRIPTION OF THE INVENTION

Figure 1:
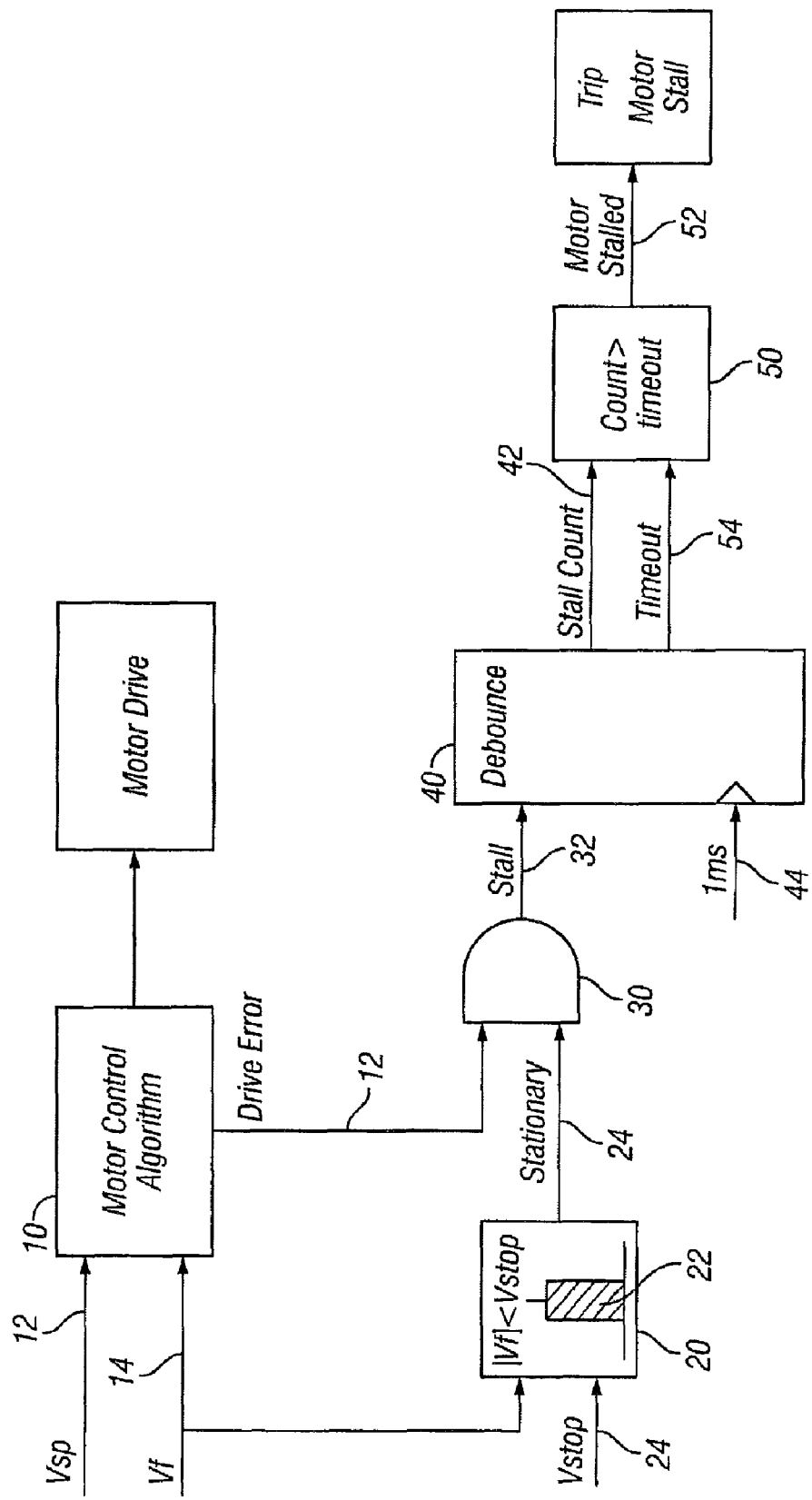
FIG. 1 is a schematic block diagram illustrating some of the principal elements of a motor controller for a drive motor of a motorized wheelchair including means for stall detection in accordance with an exemplary embodiment of the present invention.

A speed controller for a motor can fail to achieve the said required motor velocity for the following reasons:
1. excessive acceleration applied to a large mass;
2. excessive drag or hill climbing, including the stall condition;
3. unachievable speed (demand) set point.

The present invention makes use of the fact that all of the above conditions, except the stall condition, occur at speed. Referring to FIG. 1, a user defines a demand motor velocity set point Vsp (12) via an input control mechanism. The demand set point Vsp (12) and actual motor velocity Vf (14) is received at inputs to the motor control algorithms (10), wherein a "Drive Error" output flag (12) is set when the controller fails to achieve the said required motor velocity set point. In addition, a value "Vf" (14) indicative of either a direct or an indirect measurement of the actual motor velocity is also received at an input to the stall detection apparatus.

The calculated actual motor velocity "Vf" is also fed into a discriminator function (20) that evaluates "Vf" to determine whether or not the motor is stationary. The discriminator function uses predefined values (24) that define the estimated errors within the measurement of the actual motor velocity. This function is used to discriminate between errors in the measurement of the actual motor velocity and prevents incorrect triggering of the stall detection output when the motor is being driven away from stationary. In this example, if the absolute value of Vf is determined to be within the function (22) defined by predefined boundary value Vstop (24), then the output "Stationary" (24) is set true.

The apparatus further comprises an AND gate (30). When both the "Drive Error" flag (12) and the "Stationary" flag (24) are true, the output from AND gate will indicate that the motor is stationary and the speed loop is Drive Error. The output from the AND gate, "Stall" (32), is fed to a debounce filter (40) incorporating a counter, triggered by a 1 ms time pulse (44). The debounce counter outputs a debounce count signal (42) which is dependent on whether or not the input to the debounce filter (32) is true or false. Thus, every 1 ms, the debounce count (42) is incremented by 1 if the input is high and decremented by 1 if not. The debounce count (42) is compared with a preset timeout value (54) at comparator (50) and, only when the debounce count exceeds the timeout value, will a "Motor Stalled" signal (52) be output indicating that the motor has stalled and further action to protect the motor should be undertaken.

As described above, the algorithm on which the apparatus according to an exemplary embodiment of the invention is based, monitors both the actual motor speed "Vf" and a flag "Drive Error" set when the motor control algorithm cannot achieve the required motor velocity. In more detail, the "Drive Error" flag indicates when the controller cannot attain or maintain the required motor velocity due to, say, insufficient torque, insufficient speed or other external loads acting detrimentally on the motor. Gating the "Drive Error" flag when the motor velocity is "Stationary" indicates that the motor has stalled. As explained above, in order to reject transient conditions, a debounce timer is used prior to instigating further action to protect the motor, an example of which could include the means for causing the motor controller to be switched off.

It should be noted that the above-mentioned embodiment illustrates rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

Thus, although there have been described particular embodiments of the present invention of a new and useful Method and Apparatus for Stall Detection it is not intended that such references be construed as limitations upon the scope of this invention except as set forth in the following claims.

What is claimed is:

1. Stall detection apparatus for an electric motor controller, the apparatus comprising:
    an input for receiving a drive error flag indicating if the controller is unable to achieve the required motor velocity;
    an input for receiving a signal measuring, directly or indirectly, the actual motor velocity; and
    means for determining if said actual motor velocity is indicative that said motor is stationary and, only if so, outputting a Stall signal indicating that said motor has stalled.

2. Apparatus according to claim 1, including means for calculating the actual motor velocity.

3. Apparatus according to claim 1, wherein said means for determining if said actual motor velocity is indicative that said motor is stationary comprises means for evaluating the actual motor velocity using a discriminator function that defines a tolerance margin around zero, wherein if said actual motor velocity is within the margin defined by said discriminator function, it is indicative that the motor is stationary.

4. Apparatus according to claim 1, wherein said "Drive Error" flag is fed to a first input of a gate having at least two inputs, wherein the second input receives a signal indicative that the motor is stationary from said means for determining if said actual motor velocity is indicative that said motor is stationary, the output of said gate being the "Stall" flag if said at least two inputs are high.

5. Apparatus according to claim 1, further comprising a debounce filter.

6. Apparatus according to claim 5, wherein the "Stall" flag is fed to an input of the debounce filter which also includes a counter, and wherein the output of the debounce filter is indicative of whether or not the "Stall" flag is being received.

7. Apparatus according to claim 6, wherein, the output of debounce counter goes up if the "Stall" flag is being received and down if it is not.

8. Apparatus according to claim 7, wherein only when the output of the debounce counter reaches a predetermined timeout value, will a signal be output indicating that the motor has stalled.

9. An electric motor controller including stall detection apparatus according to claim 1.

10. A motorized vehicle having at least one electric motor and a motor controller including stall detection apparatus according to claim 1.

11. A method for stall detection in respect of an electric motor, the method comprising:
    receiving flag indicating if the controller is unable to achieve the required motor velocity;
    receiving a signal measuring, directly or indirectly, the actual motor velocity; and
    determining if said actual motor velocity is indicative that said motor is stationary and, only if so, outputting a "Stall" signal indicating that said motor has stalled.

\* \* \* \* \*